(12) United States Patent
Tachibana

(10) Patent No.: US 12,415,580 B2
(45) Date of Patent: Sep. 16, 2025

(54) JIG FOR POSITIONING AND ATTACHING UPPER CENTER BEAM TO VEHICLE BODY

(71) Applicant: Honda Motor Co., Ltd., Tokyo (JP)

(72) Inventor: Sho Tachibana, Tokyo (JP)

(73) Assignee: Honda Motor Co., Ltd., Tokyo (JP)

( * ) Notice: Subject to any disclaimer, the term of this patent is extended or adjusted under 35 U.S.C. 154(b) by 318 days.

(21) Appl. No.: 18/166,480

(22) Filed: Feb. 9, 2023

(65) Prior Publication Data

US 2024/0270338 A1   Aug. 15, 2024

(51) Int. Cl.
*B25B 11/00* (2006.01)
*B62D 65/02* (2006.01)

(52) U.S. Cl.
CPC ................... *B62D 65/026* (2013.01)

(58) Field of Classification Search
CPC ....... B25B 11/00; B25B 11/02; B62D 65/026; B62D 65/04
See application file for complete search history.

(56) References Cited

U.S. PATENT DOCUMENTS

| | | | |
|---|---|---|---|
| 6,389,698 B1* | 5/2002 | Malatier | B62D 65/00 29/466 |
| 11,571,773 B1* | 2/2023 | Robertson, Jr. | B23P 19/10 |
| 2021/0024152 A1* | 1/2021 | Kribernegg | B23K 37/0443 |
| 2021/0363800 A1* | 11/2021 | Dittel | B62D 65/026 |
| 2023/0150596 A1* | 5/2023 | Mo | B62D 65/022 29/897.2 |
| 2024/0217601 A1* | 7/2024 | Guzman | B62D 65/026 |
| 2024/0270338 A1* | 8/2024 | Tachibana | B62D 65/06 |

FOREIGN PATENT DOCUMENTS

JP   H09309460   12/1997

* cited by examiner

*Primary Examiner* — Lee D Wilson

(74) *Attorney, Agent, or Firm* — JCIPRNET

(57) ABSTRACT

A jig, adapted for positioning and attaching an upper center beam to a vehicle body is provided. The jig includes a jig main body and a first moving part. The jig main body includes a substrate having a first surface and a second surface opposite to the first surface, the jig main body is configured to be positioned and fixed to the vehicle body. The first moving part includes a first moving part substrate, the first moving part is configured to be movable in a first direction and movable in a second direction with respect to the jig main body. The first moving part is configured to hold the upper center beam, the upper center beam extends in a third direction. A first abutting surface is disposed on the first moving part, and configured to abut a hood of the vehicle body in a state when the hood is closed.

9 Claims, 13 Drawing Sheets

JIG FOR POSITIONING AND ATTACHING UPPER CENTER BEAM TO VEHICLE BODY

BACKGROUND OF THE DISCLOSURE

Technical Field

The disclosure relates to a jig, and more specifically relates to a temporary jig for positioning and attaching an upper center beam to a vehicle body.

Related Art

Conventionally, a temporary jig is aligned with left and right components of the vehicle body, and then a cross member (for example, an upper center beam) is fixed to a position of the vehicle body specified by (relative to) the temporary jig. A bumper face is then fixed to the cross member.
Patent Literature 1: Japanese Laid Open Number: H09-309460

However, due to error tolerances of the parts of a vehicle, a gap which is disposed between a hood and a bumper face may become relatively large, since the cross member is aligned to the left and right components of the vehicle body but is not aligned to the hood. Furthermore, a step between the hood and the bumper face due to a height difference may become relatively large.

Therefore, a jig for aligning the hood and the upper center beam is needed.

SUMMARY

According to an embodiment of the disclosure, a jig adapted for positioning and attaching an upper center beam to a vehicle body is provided. The jig includes a jig main body and a first moving part. The jig main body includes a substrate having a first surface and a second surface opposite to the first surface, the jig main body is configured to be positioned and fixed to the vehicle body. The first moving part includes a first moving part substrate, the first moving part is configured to be movable in a first direction and movable in a second direction with respect to the jig main body. The first moving part is configured to hold the upper center beam, the upper center beam extends in a third direction. A first abutting surface is disposed on the first moving part, and configured to abut a hood of the vehicle body in a state when the hood is closed.

BRIEF DESCRIPTION OF THE DRAWINGS

Embodiments will now be described, by way of example only, with reference to the accompanying drawings which are meant to be exemplary, not limiting, and wherein like elements are numbered alike in several Figures.

DESCRIPTION OF THE EMBODIMENTS

Figure 1:
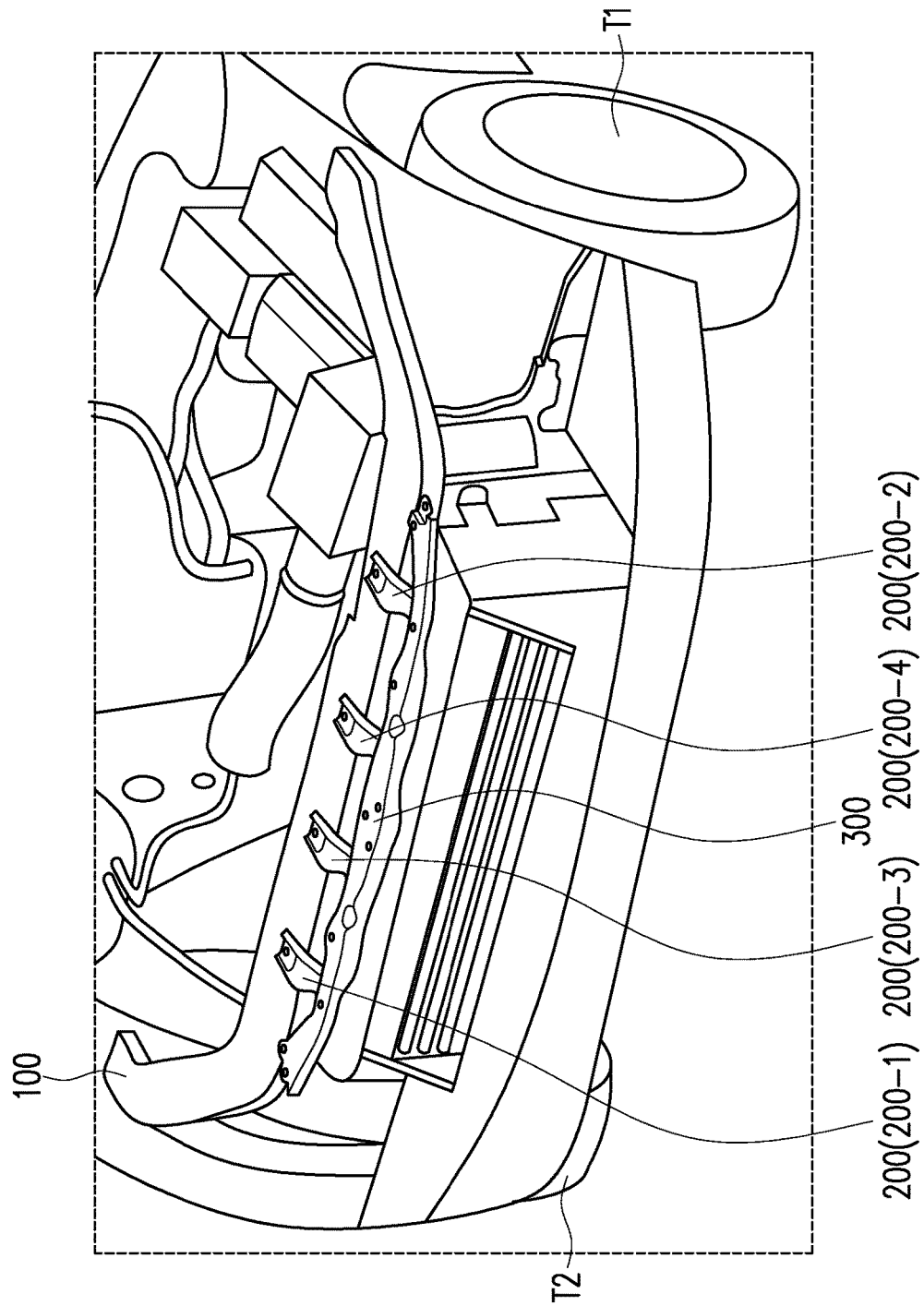
FIG. 1 is a schematic diagram illustrating a perspective view of an upper center beam attachment structure according to an embodiment of the disclosure.

FIG. 1 is a schematic diagram illustrating a perspective view of an upper center beam attachment structure according to an embodiment of the disclosure. Referring to FIG. 1, an upper center beam attachment structure 10 is provided. The upper center beam attachment structure 10 may be used for fixing an upper center beam 300 to a vehicle body. In the present embodiment, the upper center beam attachment structure 10 includes the bulkhead 100. In an embodiment of the disclosure, the bulkhead 100 may be an example of the vehicle body. However, the disclosure is not limited thereto. In another embodiment of the disclosure, the upper center beam attachment structure 10 may include another part of the vehicle. The vehicle may include a plurality of tires T1, T2. The vehicle may be powered by, for example, a gasoline engine and/or an electric engine.

Referring to FIG. 1, a first stay 200-1, a second stay 200-2, a third stay 200-3 and a fourth stay 200-4 are fixed to the bulkhead 100. The first stay 200-1, the second stay 200-2, the third stay 200-3 and the fourth stay 200-4 are each an example of a stay 200. A number of the stays 200 is not intended to limit the disclosure, and may be set according to requirements. The stay 200 may be disposed between the bulkhead 100 and the upper center beam 300. In the embodiment of FIG. 1, a bumper face is not attached to the vehicle.

Referring to FIG. 1, an upper center beam 300 is fixed to the first stay 200-1, the second stay 200-2, the third stay 200-3 and the fourth stay 200-4. The stay 200 extends in an X-direction. In addition, the stay 200 extends in a Y-direction. In the present embodiment, the stay 200 includes a surface extends in the X-Y plane. The upper center beam 300 extends in a Z-direction. The Z-direction may be, for example, a direction from the first tire T1 to the second tire T2, a direction from the second tire T2 to the first tire T1, or a width direction of the vehicle. The Y-direction may be, for example, a direction in a direction of gravity, or a direction opposite to a direction of gravity. The X-direction may be, for example, a direction from the upper center beam 300 to the bulkhead 100, a direction from the bulkhead 100 to the upper center beam 300, or a length direction of the vehicle. In the present embodiment, the X-direction, the Y-direction and the Z-direction each cross each other. More specifically, in the present embodiment, the X-direction, the Y-direction and the Z-direction are orthogonal to each other. In the present embodiment, the X-direction is an example of a "first direction", the Y-direction is an example of a "second direction", and the Z-direction is an example of a "third direction".

Figure 2:
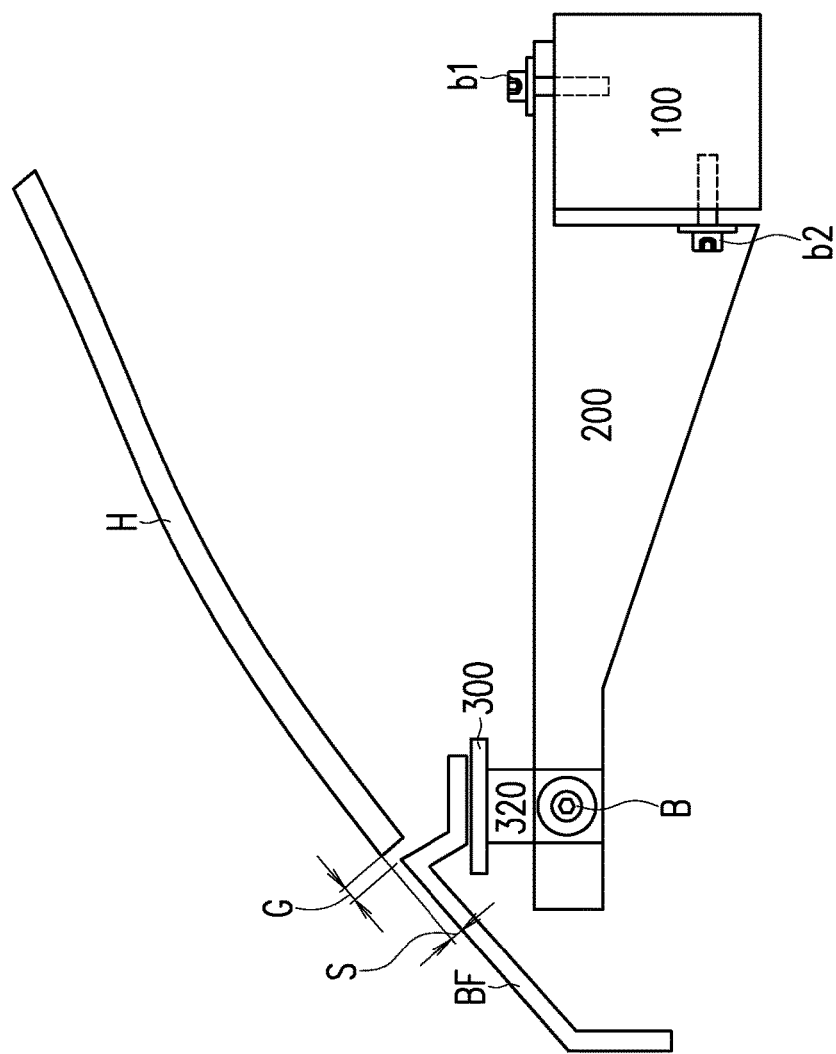
FIG. 2 is a schematic diagram illustrating a side view of an upper center beam attachment structure according to an embodiment of the disclosure.

FIG. 2 is a schematic diagram illustrating a side view of an upper center beam attachment structure according to an embodiment of the disclosure. Referring to FIG. 2, the stay 200 may be fixed to the bulkhead 100 by, for example, a bolt b1 and a bolt b2.

Referring to FIG. 2, a shape of a surface of the stay 200 may be a substantially same shape of a surface of the bulkhead 100. The upper center beam 300 may include a protruding portion 320. The upper center beam 300 may be fixed to the stay 200 by, for example, a bolt B. In the present embodiment, when viewed from the side view, a cross section of the upper center beam 300 may be a substantially "T" shape. However, the disclosure is not limited thereto, and the shape of the upper center beam 300 may be set according to requirements. When viewed from the side view, the protruding portion 320 of the upper center beam 300 may overlap with the stay 200.

Referring to FIG. 2, a bumper face BF is attached and/or fixed to the upper center beam 300. The bumper face BF may be fixed to the upper center beam 300 by, for example, a bolt or a plurality of bolts (not shown). In addition, FIG. 2 illustrates a state in which a hood H of the vehicle is closed. In the state in which the hood H is closed, a gap G is formed between the hood H and the bumper face BF.

Figure 3A:
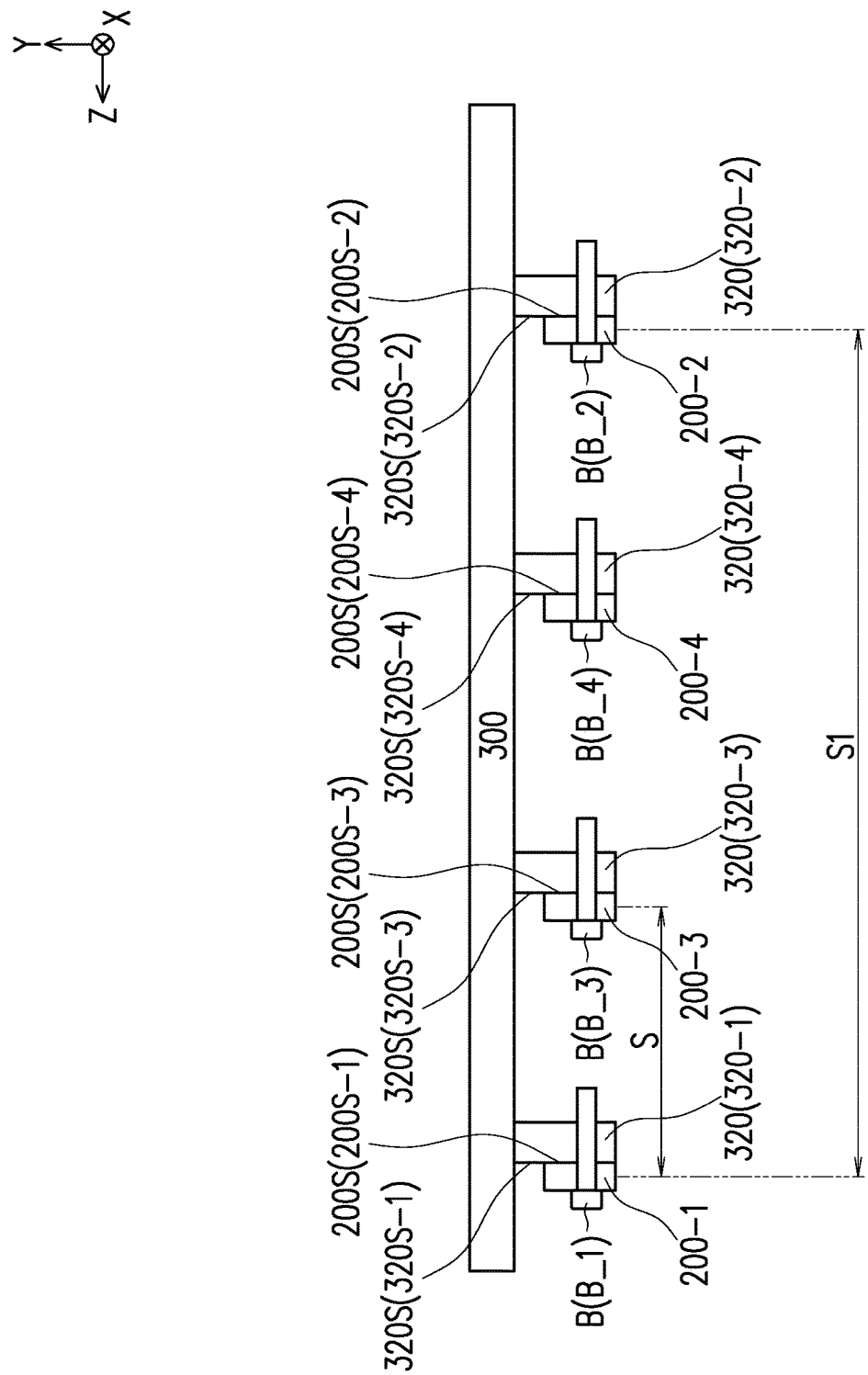
FIG. 3A is a schematic diagram illustrating a front view of the upper center beam attachment structure according to an embodiment of the disclosure.

FIG. 3A is a schematic diagram illustrating a front view of the upper center beam attachment structure according to an embodiment of the disclosure. Referring to FIG. 3A, the upper center beam 300 has a first protruding portion 320-1, a second protruding portion 320-2, a third protruding portion 320-3 and a fourth protruding portion 320-4 protruding from the upper center beam 300. The first protruding portion 320-1, the second protruding portion 320-2, the third protruding portion 320-3 and the fourth protruding portion 320-4 are each an example of the protruding portion 320 of the upper center beam 300. A number of the protruding portions 320 is not intended to limit the disclosure, and may be set according to requirements.

Referring to FIG. 3A, the upper center beam 300 has a center beam attachment side surface 320S facing the Z-direction. More specifically, a surface of the protruding portion 320 which abuts the stay 200 is the center beam attachment side surface 320S facing the Z-direction. A first center beam attachment side surface 320S-1, a second center beam attachment side surface 320S-2, a third center beam attachment side surface 320S-3 and a fourth center beam attachment side surface 320S-4 are each an example of the center beam attachment side surface 320S facing the Z-direction.

Referring to FIG. 3A, the stay 200 has a stay attachment side surface 200S facing a direction opposite to the Z-direction. More specifically, a surface of the stay 200 which abuts the protruding portion 320 is the stay attachment side surface 200S facing the direction opposite to the Z-direction. A first stay attachment side surface 200S-1, a second stay attachment side surface 200S-2, a third stay attachment side surface 200S-3 and a fourth stay attachment side surface 200S-4 are each an example of the stay attachment side surface 200S facing the direction opposite to the Z-direction.

It should be noted, in the embodiment of FIG. 3A, the first center beam attachment side surface 320S-1, the second center beam attachment side surface 320S-2, the third center beam attachment side surface 320S-3 and the fourth center beam attachment side surface 320S-4 all face a same direction, namely the Z direction. In addition, in the embodiment of FIG. 3A, the first stay attachment side surface 200S-1, the second stay attachment side surface 200S-2, the third stay attachment side surface 200S-3 and the fourth stay attachment side surface 200S-4 all face a same direction, namely the direction opposite to the Z-direction. However, the disclosure is not limited thereto. In another embodiment of the disclosure, a facing direction of the plurality of center beam attachment side surface 320S may be different, and a facing direction of the stay attachment side surface 200S may be different such as shown in an example of FIG. 3B.

Figure 3B:
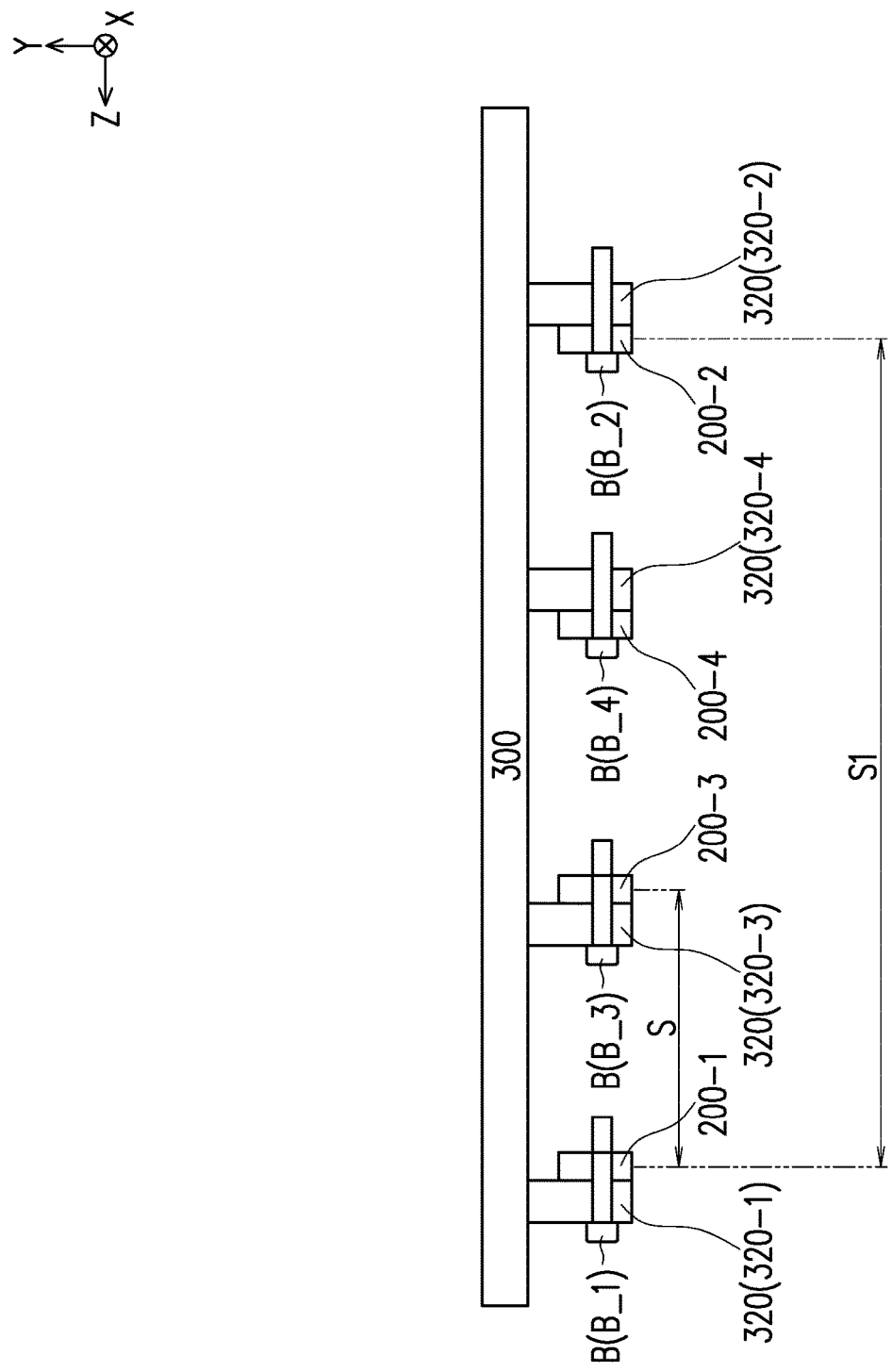
FIG. 3B is a schematic diagram illustrating a front view of the upper center beam attachment structure according to an embodiment of the disclosure.

FIG. 3B is a schematic diagram illustrating a front view of the upper center beam attachment structure according to an embodiment of the disclosure. A first difference between FIG. 3A and FIG. 3B is that, in the embodiment of FIG. 3B, the first center beam attachment side surface 320S-1, the second center beam attachment side surface 320S-2, the third center beam attachment side surface 320S-3 and the fourth center beam attachment side surface 320S-4 do not all face a same direction, and may face different directions. In addition, a second difference between FIG. 3A and FIG. 3B is that, the first stay attachment side surface 200S-1, the second stay attachment side surface 200S-2, the third stay attachment side surface 200S-3 and the fourth stay attachment side surface 200S-4 do not all face a same direction, and may face different directions.

Referring to FIG. 3A and FIG. 3B, in a state where the center beam attachment side surface 320S and the stay attachment side surface 200S face each other, the center beam attachment side surface 320S and the stay attachment side surface 200S are fixed together by the bolt B. A first bolt B_1, a second bolt B_2, a third bolt B_3 and a fourth bolt B_4 are each an example of the bolt B. The center beam attachment side surface 320S and the stay attachment side surface 200S may abut each other. In addition, a space S, extending in the Z-direction is disposed between the stays 200. For example, a first space S1, extending in the Z-direction is disposed between the first stay 200-1 and the second stay 200-2. The first space S1 is an example of the space S.

Figure 4A:
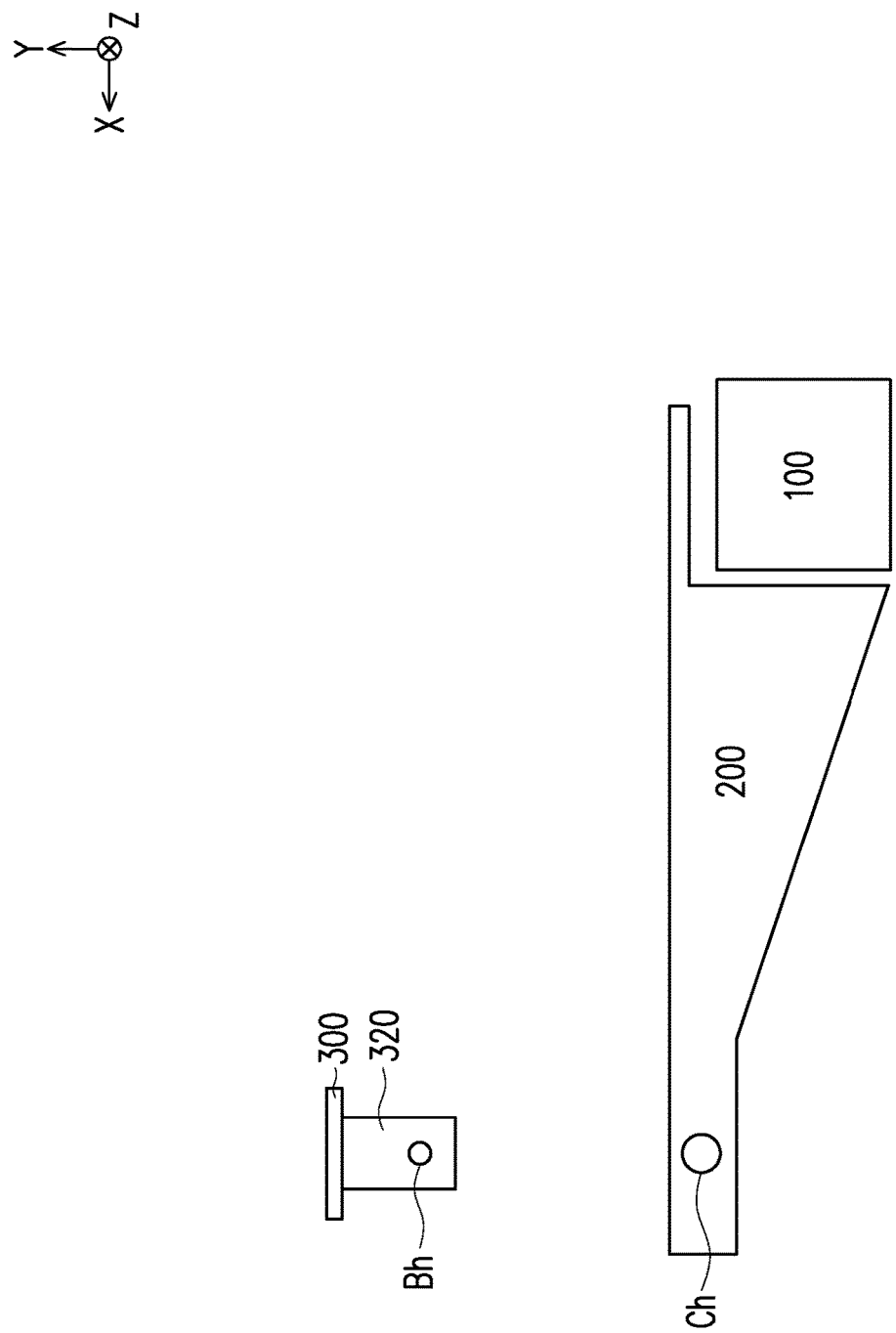
FIG. 4A is a schematic diagram illustrating a clearance hole and a bolt hole according to an embodiment of the disclosure.

FIG. 4A is a schematic diagram illustrating a clearance hole and a bolt hole according to an embodiment of the disclosure. Referring to FIG. 4A, the upper center beam 300 has a bolt hole Bh. The bolt hole Bh is disposed on the center beam attachment side surface 320S of the upper center beam 300. In addition, the stay 200 has a clearance hole Ch. The clearance hole Ch is disposed on the stay attachment side surface 200S. The bolt hole Bh is a hole penetrating the upper center beam 300, and the clearance hole Ch is a hole penetrating the stay 200. The clearance hole Ch may be threaded or not threaded, and may be set according to requirements. In addition, the bolt hole Bh may be threaded or not threaded, and may be set according to requirements.

Figure 4B:
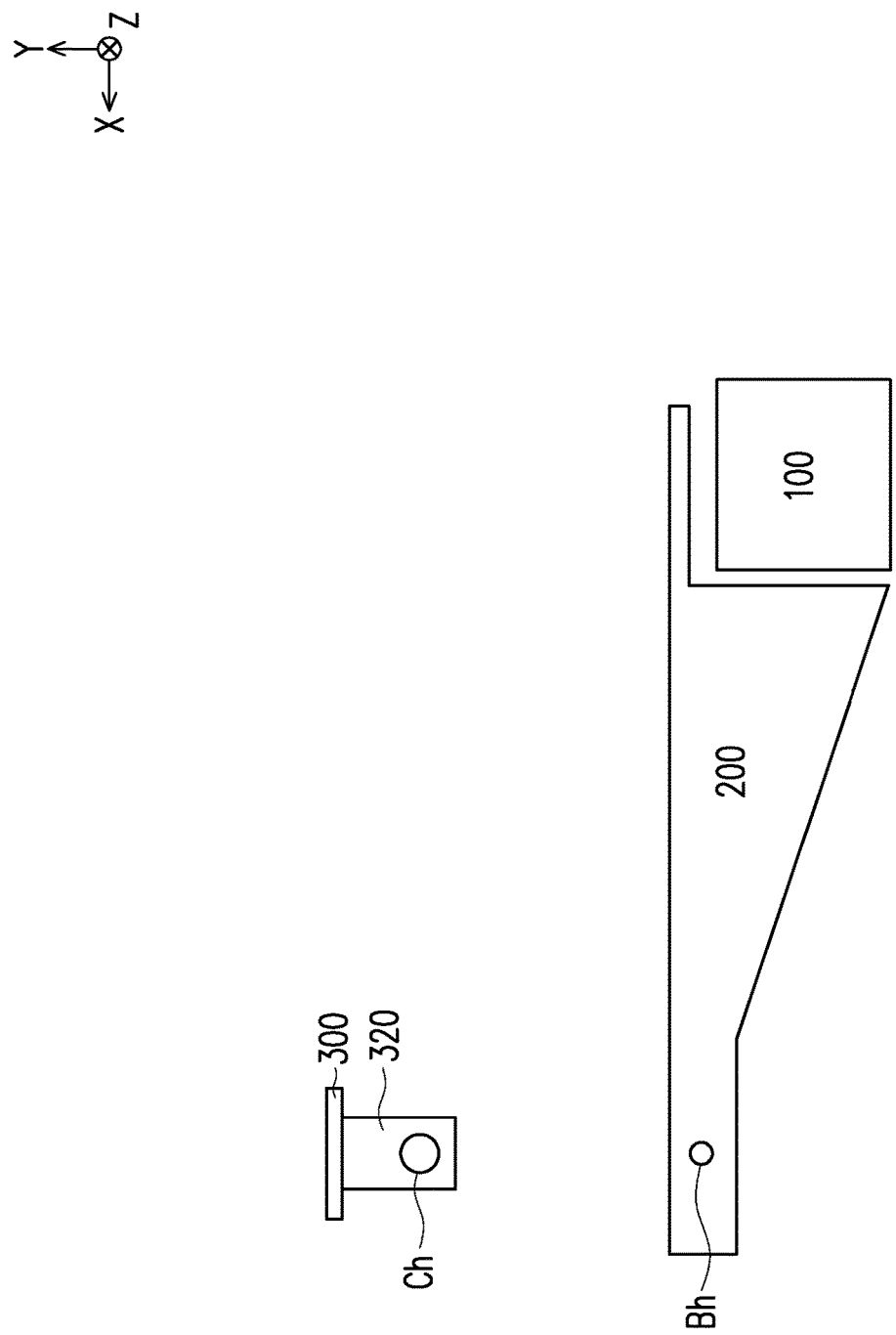
FIG. 4B is a schematic diagram illustrating a clearance hole and a bolt hole according to an embodiment of the disclosure.

FIG. 4B is a schematic diagram illustrating a clearance hole and a bolt hole according to an embodiment of the disclosure. Referring to FIG. 4B, the upper center beam 300 has a clearance hole Ch. The clearance hole Ch is disposed on the center beam attachment side surface 320S of the upper center beam 300. In addition, the stay 200 has a bolt hole Bh. The bolt hole Bh is disposed on the stay attachment side surface 200S. The bolt hole Bh is a hole penetrating the stay 200, and the clearance hole Ch is a hole penetrating the upper center beam 300. The clearance hole Ch may be threaded or not threaded, and may be set according to requirements. In addition, the bolt hole Bh may be threaded or not threaded, and may be set according to requirements.

As shown in FIG. 4A and FIG. 4B, one of the center beam attachment side surface 320S and the stay attachment side surface 200S includes a clearance hole Ch, and another of the center beam attachment side surface 320S and the stay attachment side surface 200S includes a bolt hole Bh. The bolt B is inserted into the clearance hole Ch and the bolt hole Bh to fix the upper center beam 300 to the vehicle body, for example, the bulkhead 100 via the stay 200. The bolt B may be screwed into a nut (not shown), wherein the bolt B and the nut sandwich the protruding portions 320 and the stay 200, and/or the bolt B may be screwed into the bolt hole Bh that is threaded.

Figure 5:
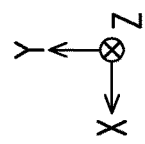
FIG. 5 is a schematic diagram illustrating a clearance between the clearance hole and the bolt hole according to an embodiment of the disclosure.
Figure 5:
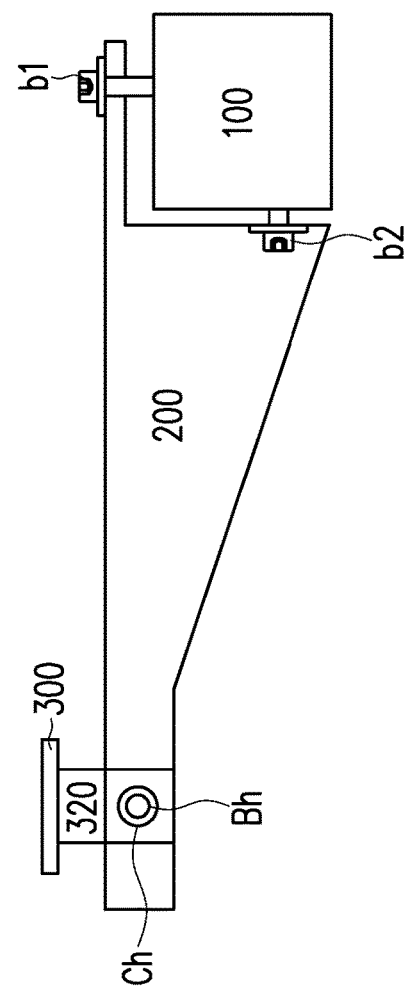

FIG. 5 is a schematic diagram illustrating a clearance between the clearance hole and the bolt hole according to an embodiment of the disclosure. Referring to FIG. 5, in an embodiment of the disclosure, a size of the bolt hole Bh may be smaller than a size of the clearance hole Ch. More specifically, a diameter of the clearance hole Ch in the X-direction may be greater than a diameter of the bolt hole Bh in the X-direction. In addition, a diameter of the clearance hole Ch in the Y-direction may be greater than a diameter of the bolt hole Bh in the Y-direction. The clearance hole Ch may have a diameter of, for example, 11 mm. The bolt hole Bh may have a diameter of, for example, 6 mm. In this way, the bolt hole Bh may have a buffer of 2.5 mm in the positive X-direction and a buffer of 2.5 mm in the negative X-direction which allows the upper center beam attachment structure 10 of the present embodiment to consistently achieve a gap G smaller than, for example, 1.0 mm. In addition, the bolt hole Bh may have a buffer of 2.5 mm in the positive Y-direction and a buffer of 2.5 mm in the negative Y-direction which allows the upper center beam attachment structure 10 of the present embodiment to consistently achieve a step S smaller than, for example, 1.0 mm. It should be noted, the above described hole sizes are describes as examples only, and are not intended to limit the disclosure.

Referring to FIG. 2, the bolt B is fixed in a state where the upper center beam 300 is positioned relative to the hood H of the vehicle body. For example, the bolt B may be fastened in a state when the hood H is closed. That is to say, a position of the upper center beam 300 in the X-direction and a position of the upper center beam 300 in the Y-direction may be adjusted, and an error between the upper center beam 300 and the stay 200 may be absorbed by the bolt hole Bh and the clearance hold Ch of the upper center beam attachment structure 10. In this way, the upper center beam attachment structure 10 of the present embodiment is able to reduce a size of the gap G between the hood H and the bumper face BF, and/or reduce a size of the step S between the hood H and the bumper face BF (due to a height difference between the hood and the bumper face).

Next, a jig adapted for positioning and attaching the upper center beam 300 to the vehicle body in order to achieve the reduction in the gap G and the step S will be described.

Figure 6:
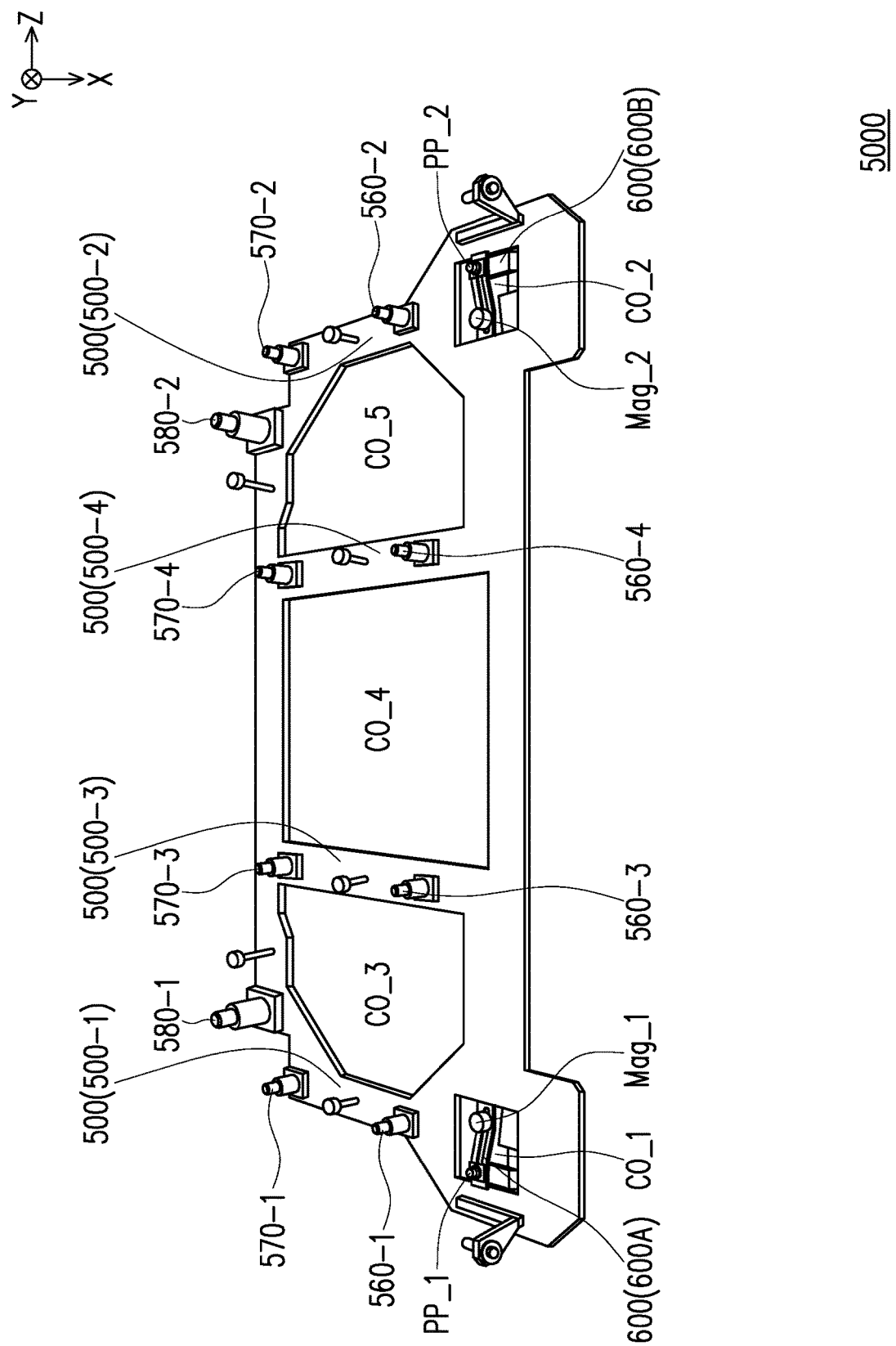
FIG. 6 is a schematic diagram illustrating a bottom view of a jig according to an embodiment of the disclosure.

FIG. 6 is a schematic diagram illustrating a bottom view of a jig according to an embodiment of the disclosure. Referring to FIG. 6, a jig 5000 adapted for positioning and attaching the upper center beam 300 to the vehicle body (for example, the bulkhead 100 and/or the hood H) is provided. That is to say, the jig main body 500 is configured to be positioned and fixed to both the bulkhead 100 of the vehicle body and the stay 200 extending in the X-direction from the bulkhead 100. In other words, the jig main body 500 is configured to be positioned and fixed to the vehicle body. The jig main body 500 may be, for example, a substrate having a first surface and a second surface opposite to the first surface. A material of the jig main body 500 may be, for example, metal, steel, stainless steel, aluminon, composite and/or the like. However, the material of the jig main body 500 is not limited thereto, and may be set according to requirements.

Referring to FIG. 6, the jig 5000 includes a jig main body 500, a first moving part 600A and a second moving part 600B. The first moving part 600A and the second moving part 600B are each an example of a moving part 600. The first moving part 600A and the second moving part 600B are disposed on the first surface of the jig main body 500. A first cut out CO_1 and a second cut out CO_2 are disposed on the jig main body 500. The first cut out CO_1 and the second cut out CO_2 are each a portion that is cut out from the jig main body 500. The first cut out CO_1 and the second cut out CO_2 each penetrate the jig main body 500. The first moving part 600A may be disposed, for example, bordering the first cut out CO_1. The second moving part 600B may be disposed, for example, bordering the second cut out CO_2.

Referring to FIG. 6, in the present embodiment, a third cut out CO_3, a fourth cut out CO_4 and a fifth cut out CO_5 are disposed on the jig main body 500, such that the jig main body may be light weight. In the present embodiment, the jig main body 500 includes a first leg 500-1, a second leg 500-2, a third leg 500-3 and a fourth leg 500-4 due to the third cut out CO_3, the fourth cut out CO_4, and the fifth cut out CO_5. However, in another embodiment of the disclosure, the third cut out CO_3, the fourth cut out CO_4, and the fifth cut out CO_5 may be omitted. A number of the cut outs is not limited hereto, and may be set according to requirements. A number of legs may be set according to a number of the cut outs.

Referring to FIG. 6, the jig main body 500 may include a first protruding support 560-1, a second protruding support 560-2, a third protruding support 560-3 and a fourth protruding support 560-4 protruding from the second surface of the jig main body 500. The first protruding support 560-1, the second protruding support 560-2, the third protruding support 560-3 and the fourth protruding support 560-4 are each an example of a protruding support 560. In the present embodiment, the protruding support 560 is a circular shape. More specifically, the protruding support 560 is a cylindrical shape. However, the disclosure is not limited thereto. In another embodiment of the disclosure, the protruding support may be a rectangular shape, a polygonal shape and/or the like, and may be set according to requirements. The protruding support 560 and the jig main body 500 may be integrally formed or separately formed, and is not intended to limit the disclosure. The protruding support 560 may include a step and/or not include a step. A number of the steps per protruding support 560 is not intended to limit the disclosure.

Referring to FIG. 6, the jig main body 500 may include a first protruding auxiliary support 570-1, a second protruding auxiliary support 570-2, a third protruding auxiliary support 570-3 and a fourth protruding auxiliary support 570-4 protruding from the second surface of the jig main body 500. The first protruding auxiliary support 570-1, the second protruding auxiliary support 570-2, the third protruding auxiliary support 570-3 and the fourth protruding auxiliary support 570-4 are each an example of a protruding auxiliary support 570. In the present embodiment, the protruding auxiliary support 570 is a circular shape. More specifically, the protruding auxiliary support 570 is a cylindrical shape. However, the disclosure is not limited thereto. In another embodiment of the disclosure, the protruding auxiliary support may be a rectangular shape, a polygonal shape and/or the like, and may be set according to requirements. The protruding auxiliary support 570 and the jig main body 500 may be integrally formed or separately formed, and is not intended to limit the disclosure. The protruding support 570 may include a step and/or not include a step. A number of the steps per protruding auxiliary support 570 is not intended to limit the disclosure.

Referring to FIG. 6, the jig main body 500 may include a first main support 580-1 and a second main support 580-2 protruding from the second surface of the jig main body 500. The first main support 580-1 and the second main support 580-2 are each an example of a main support 580. In the present embodiment, the main support 580 is a circular shape. More specifically, the main support 580 is a cylindrical shape. However, the disclosure is not limited thereto. In another embodiment of the disclosure, the main support may be a rectangular shape, a polygonal shape and/or the like, and may be set according to requirements. The main support 580 and the jig main body 500 may be integrally formed or separately formed, and is not intended to limit the disclosure. The main support 580 may include a step and/or not include a step. A number of the steps per main support 580 is not intended to limit the disclosure.

In an embodiment of the disclosure, the protruding support 560 may include a hole penetrating the protruding support 560 in the Y-direction, wherein a bolt is inserted in the hole from the first surface side. In an embodiment of the disclosure, the protruding auxiliary support 570 may include a hole penetrating the protruding auxiliary support 570 in the Y-direction, wherein a bolt is inserted in the hole from the first surface side. In an embodiment of the disclosure, the main support 580 may include a hole penetrating the main support 580 in the Y-direction, wherein a bolt is inserted in the hole from the first surface side. The bolt may be used to secure/fix the jig 5000 to the vehicle body (for example, the stay 200 and/or the bulkhead 100).

Figure 7A:
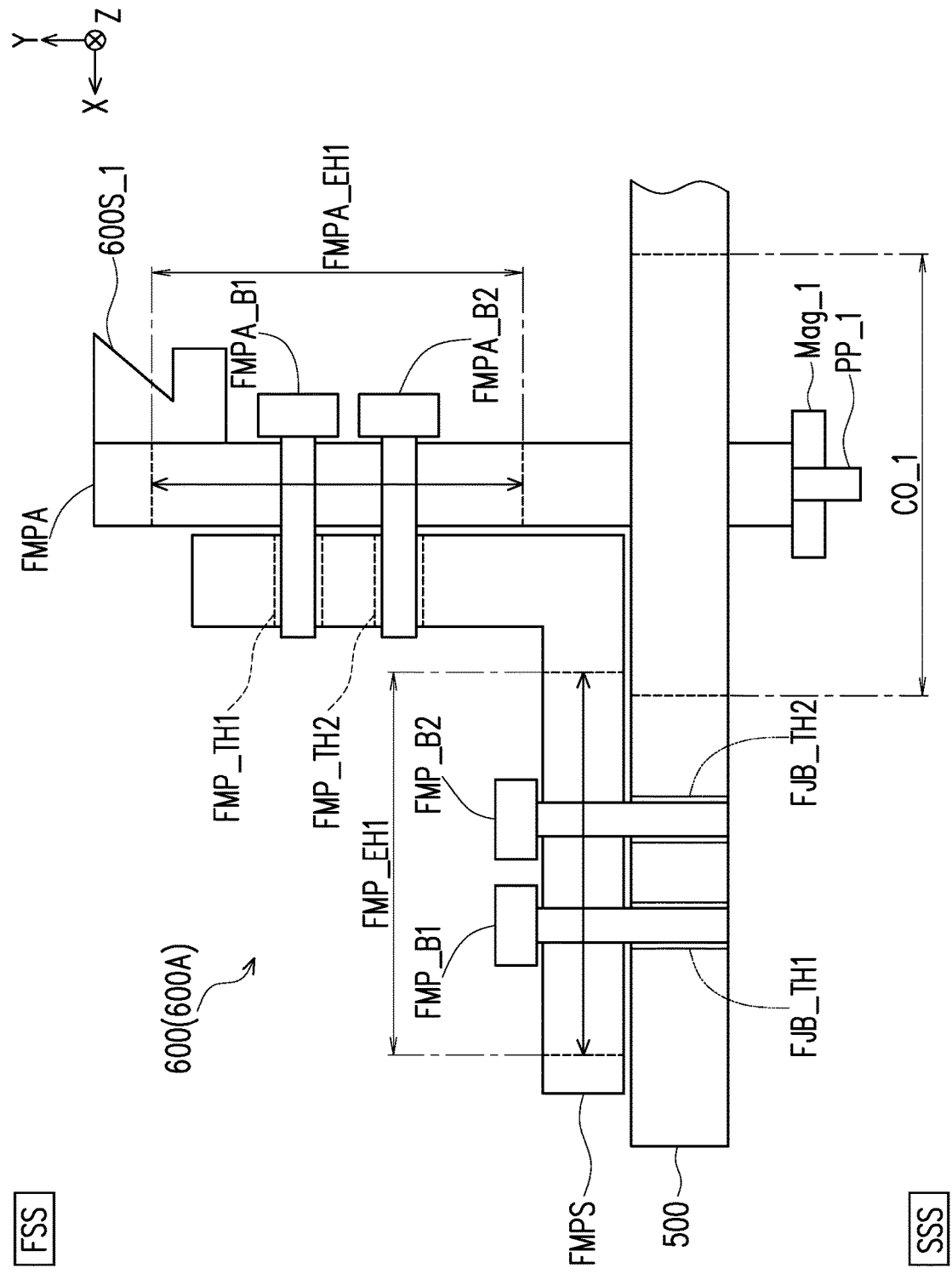
FIG. 7A is a schematic diagram illustrating a first moving part according to an embodiment of the disclosure.

FIG. 7A is a schematic diagram illustrating a first moving part according to an embodiment of the disclosure. Referring to FIG. 7A, the first moving part 600A is configured to be movable in the X-direction and movable in the Y-direction with respect to the jig main body 500, wherein the first moving part 600A is configured to hold the upper center beam 300. The first moving part 600A includes a first moving part substrate FMPS. A first moving part elongated hole FMP_EH1 is disposed on the first moving part substrate FMPS, the first moving part elongated hole FMP_EH1 is an elongated hole. The first moving part elongated hole FMP_EH1 is elongated in, for example, the X-direction.

Referring to FIG. 7A, a first jig main body threaded hole FJB_TH1 is disposed on the jig main body 500, the first jig main body threaded hole FJB_TH1 may be threaded or not threaded. A first jig main body threaded hole FJB_TH2 is disposed on the jig main body 500, the first jig main body threaded hole FJB_TH2 may be threaded or not threaded. In the present embodiment, the first jig main body threaded hole FJB_TH1 and the first jig main body threaded hole FJB_TH2 are threaded. A first moving part bolt FMP_B1 is disposed in the first moving part elongated hole FMP_EH1, and the first moving part bolt FMP_B1 is fixed to the first jig main body threaded hole FJB_TH1 of the jig main body 500 by screwing. In addition, a first moving part bolt FMP_B2 is disposed in the first moving part elongated hole FMP_EH1, and the first moving part bolt FMP_B2 is fixed to the first jig main body threaded hole FJB_TH2 of the jig main body 500 by screwing. In this way, the first moving part substrate FMPS is configured to be movable in the X-direction with respect to the jig main body 500 via the first moving part elongated hole FMP_EH1.

In another embodiment of the disclosure, the first jig main body threaded hole FJB_TH1 and/or the first jig main body threaded hole FJB_TH2 may not be threaded. If the first jig main body threaded hole FJB_TH1 and/or the first jig main body threaded hole FJB_TH2 are not threaded, a nut(s) may be used to fasten the first moving part bolt FMP_B1 and/or the first moving part bolt FMP_B2.

Referring to FIG. 7A, the first moving part 600A further includes a first moving part attachment FMPA including a substrate. The first moving part attachment FMPA is disposed in the first cut out CO_1 of the jig main body 500, wherein the first moving part attachment FMPA extends from a first surface side FSS of the jig main body 500 to a second surface side SSS of the jig main body 500. The second surface side SSS is a side of the jig main body 500 opposite to the first surface side FSS of the jig main body 500. A first magnet Mag_1 is disposed on the first moving part attachment FMPA, wherein the first magnet Mag_1 is configured to fix the upper center beam 300 to the first magnet Mag_1. As shown in FIG. 7A, in the present embodiment, the first magnet Mag_1 is disposed on the second surface side SSS of the jig main body 500.

Referring to FIG. 7A, a first moving part attachment elongated hole FMPA_EH1 is disposed on the first moving part attachment FMPA, wherein the first moving part attachment elongated hole FMPA_EH1 is an elongated hole. The first moving part attachment elongated hole FMPA_EH1 is elongated in, for example, the Y-direction. In addition, a first moving part threaded hole FMP_TH1 is disposed on the first moving part substrate FMPS, the first moving part threaded hole FMP_TH1 may be threaded or not threaded. Furthermore, a first moving part threaded hole FMP_TH2 is disposed on the first moving part substrate FMPS, the first moving part threaded hole FMP_TH2 may be threaded or not threaded. In the present embodiment, the first moving part threaded hole FMP_TH1 and the first moving part threaded hole FMP_TH2 are threaded. A first moving part attachment bolt FMPA_B1 is disposed in the first moving part attachment elongated hole FMPA_EH1, and the first moving part attachment bolt FMPA_B1 is fixed to the first moving part threaded hole FMP_TH1 of the first moving part substrate FMPS by screwing. In addition, a first moving part attachment bolt FMPA_B2 is disposed in the first moving part attachment elongated hole FMPA_EH1, and the first moving part attachment bolt FMPA_B2 is fixed to the first moving part threaded hole FMP_TH2 of the first moving part substrate FMPS by screwing. In this way, the first moving part attachment FMPA is configured to be movable in the Y-direction with respect to the jig main body 500 via the first moving part attachment elongated hole FMPA_EH1.

Referring to FIG. 7A, a first abutting surface 600S_1 is disposed on the first moving part 600A, the first abutting surface 600S_1 is configured to abut the hood H of the vehicle body in a state when the hood H is closed. More specifically, the first abutting surface 600S_1 of the first moving part 600A is configured to abut an outside surface of the hood H in the state when the hood H is closed. Furthermore, a first positioning part PP_1 including a first protrusion is disposed on the first moving part attachment FMPA. The first positioning part PP_1 is configured to engage with a first shape of the upper center beam 300 to position the upper center beam 300 relative to the first positioning part PP_1 and also position the upper center beam 300 relative to the first abutting surface 600S_1. The first shape may be a hole and/or a specific surface shape in the upper center beam 300. In an embodiment of the disclosure, a material of the first abutting surface 600S_1 may be different from a material of the jig main body 500. The material of the first abutting surface 600S_1 may be selected to be softer than a material of the hood H such that the hood H is not damaged and/or scratched by the first abutting surface 600S_1. The material of the first abutting surface 600S_1 may be, for example, resin, rubber and the like. The material of the first abutting surface 600S_1 is not limited hereto, and may be set according to requirements. Furthermore, in an embodiment of the disclosure, a shape of the first abutting surface 600S_1 may be configured to be substantially same as a shape of a portion of the hood H that is abutted by the first abutting surface 600S_1. The first abutting surface 600S_1 is disposed on the first surface side FSS of the jig main body 500.

Figure 7B:
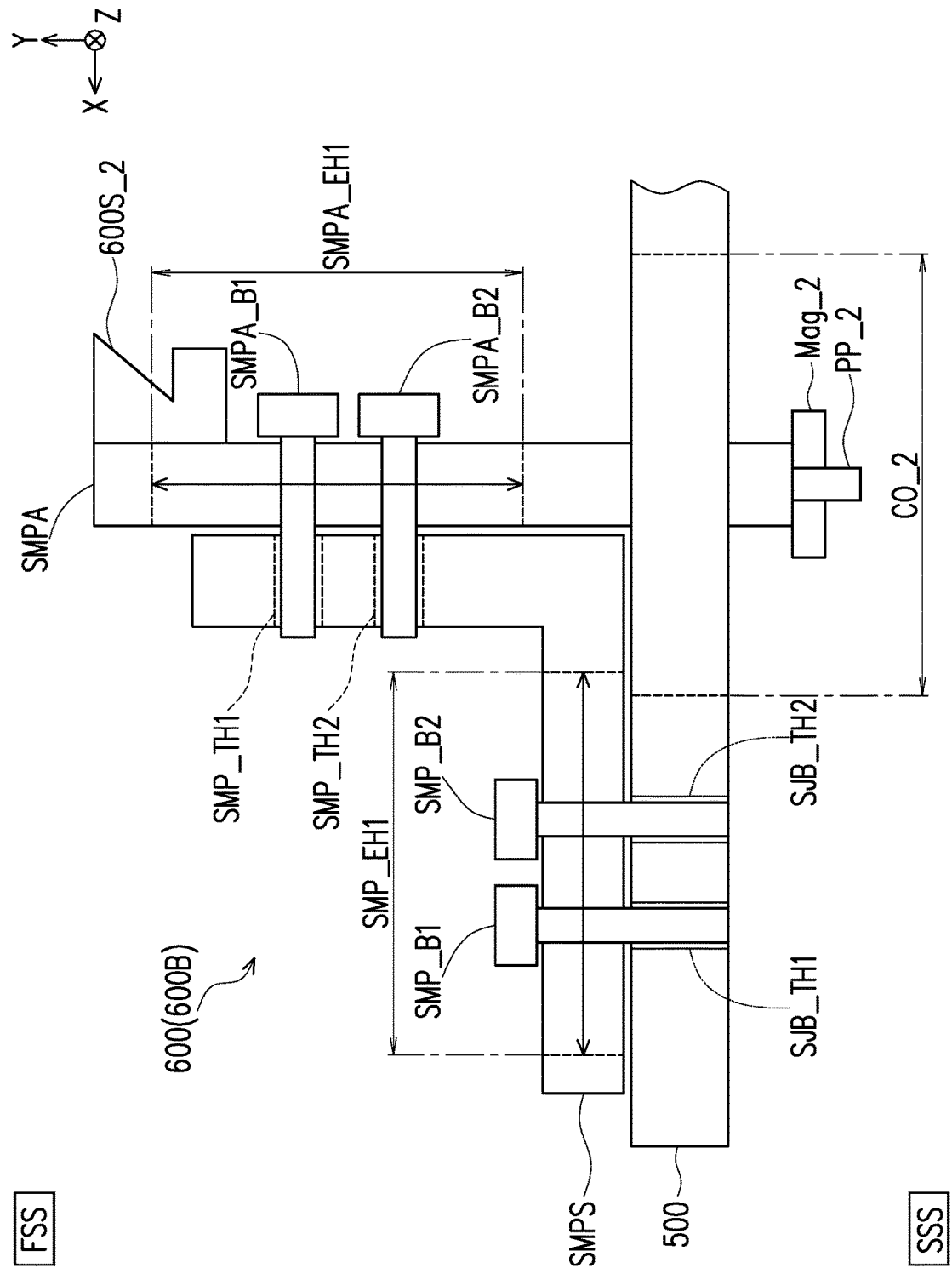
FIG. 7B is a schematic diagram illustrating a second moving part according to an embodiment of the disclosure.

FIG. 7B is a schematic diagram illustrating a second moving part according to an embodiment of the disclosure. Referring to FIG. 7B, the second moving part 600B is configured to be movable in the X-direction and movable in the Y-direction with respect to the jig main body 500, wherein the second moving part 600B is configured to hold the upper center beam 300. The second moving part 600B includes a second moving part substrate SMPS. A second moving part elongated hole SMP_EH1 is disposed on the second moving part substrate SMPS, the second moving part elongated hole SMP_EH1 is an elongated hole. The second moving part elongated hole SMP_EH1 is elongated in, for example, the X-direction.

Referring to FIG. 7B, a second jig main body threaded hole SJB_TH1 is disposed on the jig main body 500, the second jig main body threaded hole SJB_TH1 may be threaded or not threaded. A second jig main body threaded hole SJB_TH2 is disposed on the jig main body 500, the second jig main body threaded hole SJB_TH2 may be threaded or not threaded. In the present embodiment, the second jig main body threaded hole SJB_TH1 and the second jig main body threaded hole SJB_TH2 are threaded. A second moving part bolt SMP_B1 is disposed in the second moving part elongated hole SMP_EH1, and the second moving part bolt SMP_B1 is fixed to the second jig main body threaded hole SJB_TH1 of the jig main body 500 by screwing. In addition, a second moving part bolt SMP_B2 is disposed in the second moving part elongated hole SMP_EH1, and the second moving part bolt SMP_B2 is fixed to the second jig main body threaded hole SJB_TH2 of the jig main body 500 by screwing. In this way, the second moving part substrate SMPS is configured to be movable in the X-direction with respect to the jig main body 500 via the second moving part elongated hole SMP_EH1.

In another embodiment of the disclosure, the second jig main body threaded hole SJB_TH1 and/or the second jig main body threaded hole SJB_TH2 may not be threaded. If the second jig main body threaded hole SJB_TH1 and/or the second jig main body threaded hole SJB_TH2 are not threaded, a nut(s) may be used to fasten the second moving part bolt SMP_B1 and/or the second moving part bolt SMP_B2.

Referring to FIG. 7B, the second moving part 600B further includes a second moving part attachment SMPA including a substrate. The second moving part attachment SMPA is disposed in the second cut out CO_2 of the jig main body 500, wherein the second moving part attachment SMPA extends from the first surface side FSS of the jig main body 500 to the second surface side SSS of the jig main body 500. The second surface side SSS is a side of the jig main body 500 opposite to the first surface side FSS of the jig main body 500. A second magnet Mag_2 is disposed on the second moving part attachment SMPA, wherein the second magnet Mag_2 is configured to fix the upper center beam 300 to the second magnet Mag_2. As shown in FIG. 7B, in the present embodiment, the second magnet Mag_2 is disposed on the second surface side SSS of the jig main body 500.

Referring to FIG. 7B, a second moving part attachment elongated hole SMPA_EH1 is disposed on the second moving part attachment SMPA, wherein the second moving part attachment elongated hole SMPA_EH1 is an elongated hole. The second moving part attachment elongated hole SMPA_EH1 is elongated in, for example, the Y-direction. In addition, a second moving part threaded hole SMP_TH1 is disposed on the second moving part substrate SMPS, the second moving part threaded hole SMP_TH1 may be threaded or not threaded. Furthermore, a second moving part threaded hole SMP_TH2 is disposed on the second moving part substrate SMPS, the second moving part threaded hole SMP_TH2 may be threaded or not threaded. In the present embodiment, the second moving part threaded hole SMP_TH1 and the second moving part threaded hole SMP_TH2 are threaded. A second moving part attachment bolt SMPA_B1 is disposed in the second moving part attachment elongated hole SMPA_EH1, and the second moving part attachment bolt SMPA_B1 is fixed to the second moving part threaded hole SMP_TH1 of the second moving part substrate SMPS by screwing. In addition, a second moving part attachment bolt SMPA_B2 is disposed in the second moving part attachment elongated hole SMPA_EH1, and the second moving part attachment bolt SMPA_B2 is fixed to the second moving part threaded hole SMP_TH2 of the second moving part substrate SMPS by screwing. In this way, the second moving part attachment SMPA is configured to be movable in the Y-direction with respect to the jig main body 500 via the second moving part attachment elongated hole SMPA_EH1.

Referring to FIG. 7B, a second abutting surface 600S_2 is disposed on the second moving part 600B, the second abutting surface 600S_2 is configured to abut the hood H of the vehicle body in a state when the hood H is closed. More specifically, the second abutting surface 600S_2 of the second moving part 600B is configured to abut an outside surface of the hood H in the state when the hood H is closed. Furthermore, a second positioning part PP_2 including a second protrusion is disposed on the second moving part attachment SMPA. The second positioning part PP_2 is configured to engage with a second shape of the upper center beam 300 to position the upper center beam 300 relative to the second positioning part PP_2 and also position the upper center beam 300 relative to the second abutting surface 600S_2. The second shape may be a hole and/or a specific surface shape in the upper center beam 300. In an embodiment of the disclosure, a material of the second abutting surface 600S_2 may be different from a material of the jig main body 500. The material of the second abutting surface 600S_2 may be selected to be softer than the material of the hood H such that the hood H is not damaged and/or scratched by the second abutting surface 600S_2. The material of the second abutting surface 600S_2 may be, for example, resin, rubber and the like. The material of the second abutting surface 600S_2 is not limited hereto, and may be set according to requirements. Furthermore, in an embodiment of the disclosure, a shape of the second abutting surface 600S_2 may be configured to be substantially same as a shape of a portion of the hood H that is abutted by the second abutting surface 600S_2. The second abutting surface 600S_2 is disposed on the first surface side FSS of the jig main body 500. The second abutting surface 600S_2 may have a shape symmetrical to the first abutting surface 600S_1 with respect to an imaginary line passing between the first abutting surface 600S_1 and the second abutting surface 600S_2. A material of the second abutting surface 600S_2 may be same as the material of the first abutting surface 600S_1.

Figure 8:
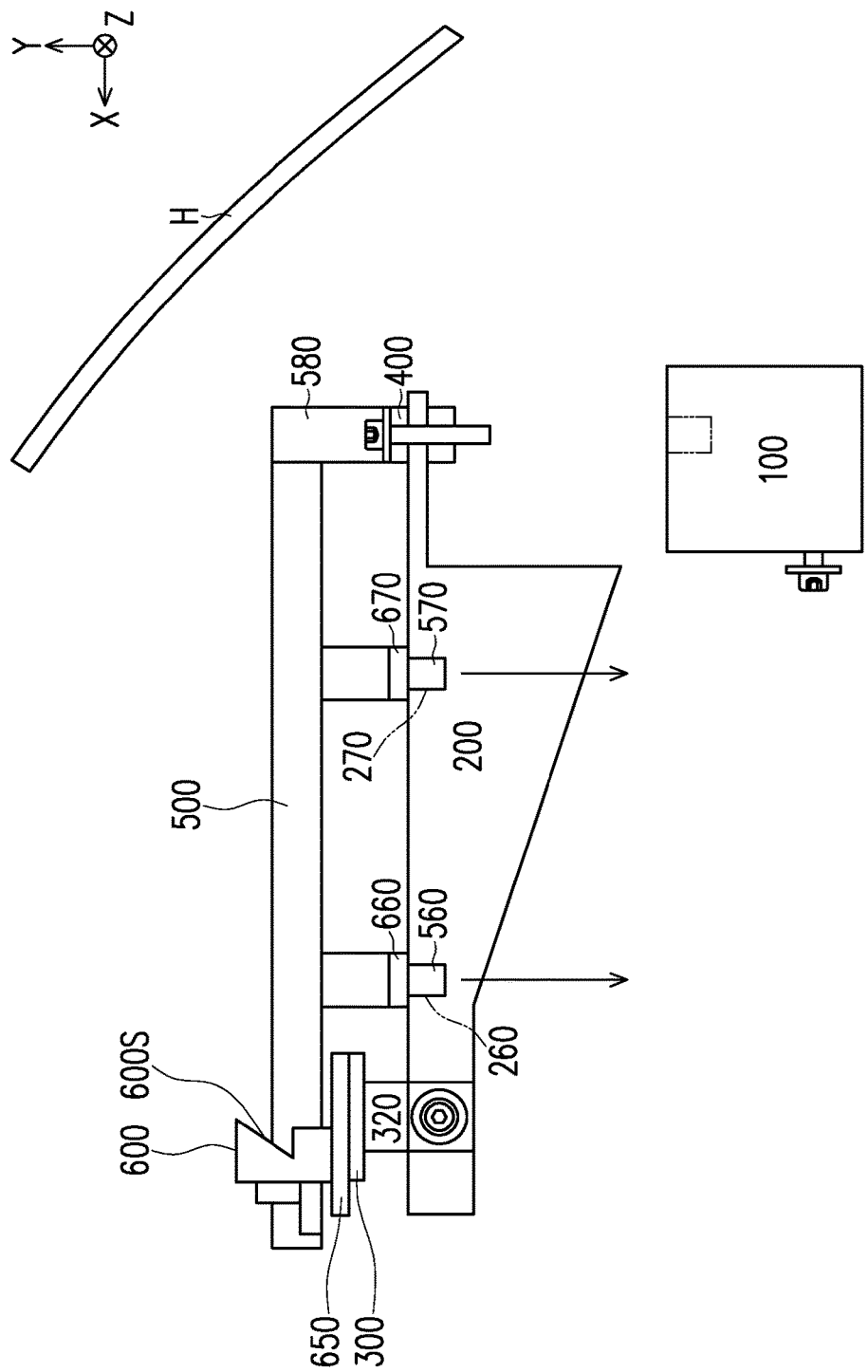
FIG. 8 is a schematic diagram illustrating a jig for positioning and attaching an upper center beam to a vehicle body in a first state according to an embodiment of the disclosure.

FIG. 8 is a schematic diagram illustrating a jig for positioning and attaching an upper center beam to a vehicle body in a first state according to an embodiment of the disclosure. Referring to FIG. 8, the upper center beam 300 is attached to the jig 5000 via, for example, a magnet 650 of the moving part 600 using magnetism. In addition, the stay 200 may be attached to the jig 5000 via, for example, a magnet 660, a magnet 670 and a magnet 400. The "first state" is, for example, a state in which the jig 5000 is not yet attached to the vehicle body (for example, the stay 200 or the bulkhead 100). The first magnet Mag_1 shown in FIG. 7A and the second magnet Mag_2 shown in FIG. 7B are an example of the magnet 650 shown in FIG. 8. In the present embodiment, the magnet 660 may be disposed on the protruding support 560, the magnet 670 may be disposed on the protruding auxiliary support 570, and the magnet 400 may be disposed on the main support 580. In another embodiment of the disclosure, one or more of the magnet 660, the magnet 670, the magnet 400 may be omitted, and a number of the magnets is not intended to limit the disclosure. As shown in FIG. 8, the protruding support 560 engages with a stay hole 260 in the stay 200 and the protruding auxiliary support 570 engages with a hole 270 in the stay 200. After the upper center beam 300 and the stay 200 are attached to the jig 5000, then the jig 5000 including the upper center beam 300 and the stay 200 may be attached to the vehicle body, namely the bulkhead 100, in a direction of the two arrows shown in FIG. 8. Then the stay 200 may be fixed to the bulkhead 100 via the bolt b1 and the bolt b2. In this state, the upper center beam 300 is not yet fixed to the stay 200. That is to say, the bolt B shown in FIG. 4 are not yet tightened. In other words, the bolt B shown in FIG. 4 may not be inserted through the bolt hole Bh and the clearance hold Ch, or the bolt B may be inserted through the bolt hole Bh and the clearance hole Ch but not tightened. In this way, the position of the upper center beam 300 may move relative to the stay 200 even after the stay 200 is fixed to the bulkhead 100 by the bolt b1, b2).

Figure 9:
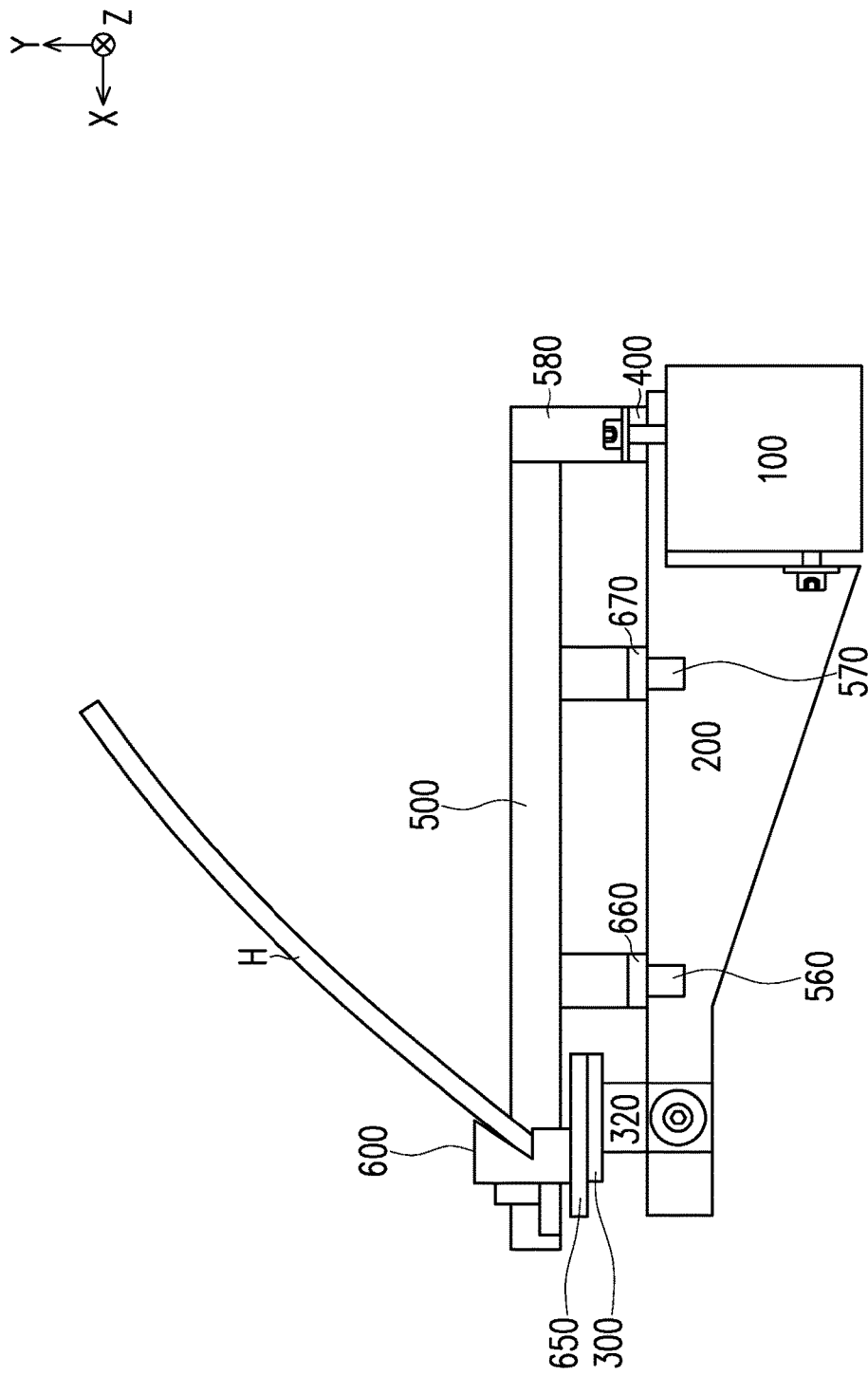
FIG. 9 is a schematic diagram illustrating a jig for positioning and attaching an upper center beam to a vehicle body in a second state according to an embodiment of the disclosure.

FIG. 9 is a schematic diagram illustrating a jig for positioning and attaching an upper center beam to a vehicle body in a second state according to an embodiment of the disclosure. Referring to FIG. 9, the "second state" is, for example, a state in which the jig 5000 is attached to the vehicle body (for example, the bulkhead 100). The jig 5000 may be temporarily secured/fixed to the vehicle body (for example, the bulkhead 100) by, for example, the stay 200, and the magnets 660, 670, 400. After the jig 5000 is secured/fixed to the vehicle body, a position of the upper center beam 300 in the X-direction and a position of the upper center beam 300 in the Y-direction may be adjusted via the moving part 600 since the upper center beam 300 is attached to the moving part 600 of the jig 5000. Next, the hood H may be brought down to abut the abutting surface 600S, such that the position of the upper center beam 300 may be aligned relative to the hood H. In turn, a position of the bumper face BF that is later fixed to the upper center beam 300 may be aligned with respect to the hood H more precisely such that a size of the gap G between the hood H and the bumper face BF is reduced, and/or a size of the step S between the hood H and the bumper face BF (due to a height difference between the hood and the bumper face) is reduced. In this way, the gap G smaller than, for example, 1.0 mm may be consistently achieved. In addition, a step S smaller than, for example, 1.0 mm may be consistently achieved.

Figure 10:
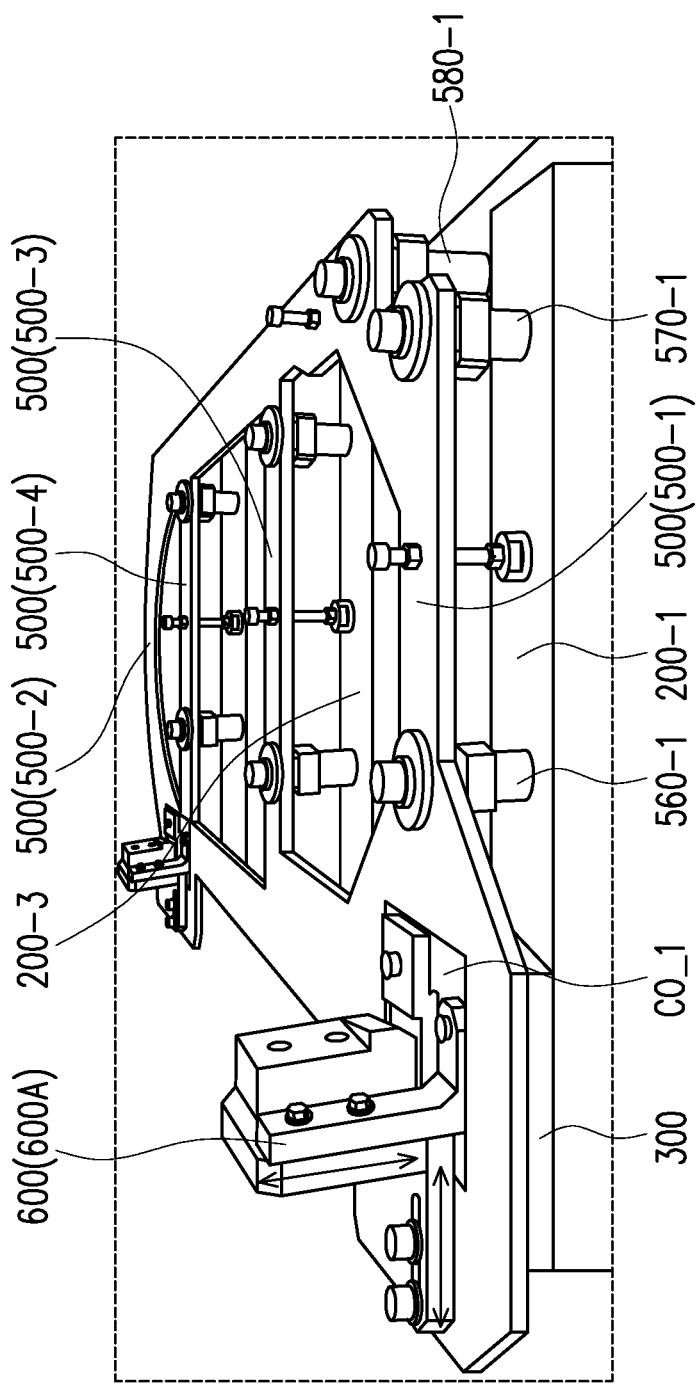
FIG. 10 is a schematic diagram illustrating a perspective view of a jig in a second state according to an embodiment of the disclosure.

FIG. 10 is a schematic diagram illustrating a perspective view of a jig in a second state according to an embodiment of the disclosure. Referring to FIG. 10, the protruding support 560 may include a hole penetrating the protruding support 560 in the Y-direction, wherein a bolt is inserted in the hole from the first surface side. In an embodiment of the disclosure, the protruding auxiliary support 570 may include a hole penetrating the protruding auxiliary support 570 in the Y-direction, wherein a bolt is inserted in the hole from the first surface side. In an embodiment of the disclosure, the main support 580 may include a hole penetrating the main support 580 in the Y-direction, wherein a bolt is inserted in the hole from the first surface side. The bolt may be used to secure/fix the jig 5000 to the vehicle body (for example, the bulkhead 100) via the stay 200.

It should be noted, in an embodiment of the disclosure, the moving part 600 may be configured to be movable in the Z-direction with respect to the jig main body 500. The moving part 600 may be configured to be movable in the Z-direction by, for example, an elongated hole configuration. In addition, an embodiment where the moving part 600 includes an elongated hole for moving the moving part 600 was described in FIG. 7A and FIG. 7B as an example. However, the disclosure is not limited thereto, and other configurations for moving the moving part 600 in the X-direction and the Y-direction may be used according to requirements.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A jig, adapted for positioning and attaching an upper center beam to a vehicle body, wherein a bumper face is adapted to be attached to the upper center beam, the jig comprising:
    a jig main body, comprising a main substrate having a first surface and a second surface opposite to the first surface, the jig main body is configured to be positioned and fixed to the vehicle body;
    a first moving part, comprising a first moving part substrate, the first moving part is configured to be movable in a first direction and movable in a second direction with respect to the jig main body, wherein the first moving part is configured to hold the upper center beam, the upper center beam extending in a third direction;
    a first abutting surface, disposed on the first moving part, the first abutting surface is configured to abut a hood of the vehicle body in a state when the hood is closed,
    a first moving part attachment, comprising a substrate, configured to be movable in the second direction with respect to the first moving part substrate, wherein the first moving part attachment extends from a first surface side of the jig main body to a second surface side of the jig main body that is opposite to the first surface side.

2. The jig according to claim 1, wherein the jig main body is configured to be positioned and fixed to both a bulkhead of the vehicle body and a stay extending in the first direction from the bulkhead.

3. The jig according to claim 1, further comprising:
a second moving part, comprising a second moving part substrate, the second moving part is configured to be movable in the first direction and movable in the second direction with respect to the jig main body, wherein the second moving part is configured to hold the upper center beam,
a second abutting surface, disposed on the second moving part, the second abutting surface is configured to abut the hood of the vehicle body in the state when the hood is closed,
wherein the second abutting surface has a shape symmetrical to the first abutting surface.

4. The jig according to claim 1, wherein the first abutting surface of the first moving part is configured to abut an outside surface of the hood in the state when the hood is closed.

5. The jig according to claim 3, further comprising:
a second jig main body threaded hole disposed on the jig main body, the second jig main body threaded hole is threaded,
a second moving part elongated hole disposed on the second moving part substrate, the second moving part elongated hole is an elongated hole,
a second moving part bolt disposed in the second moving part elongated hole, and the second moving part bolt is fixed to the second jig main body threaded hole.

6. The jig according to claim 5, wherein the second moving part further comprises:
a second moving part attachment, comprising a substrate;
a second moving part attachment elongated hole, disposed on the second moving part attachment, wherein the second moving part attachment elongated hole is an elongated hole,
a second moving part threaded hole, disposed on the second moving part substrate, the second moving part threaded hole is threaded,
a second moving part attachment bolt, disposed in the second moving part attachment elongated hole, and the second moving part attachment bolt is fixed to the second moving part threaded hole by screwing.

7. The jig according to claim 6, further comprising:
a first cut out, disposed on the jig main body;
a second cut out, disposed on the jig main body;
wherein the first moving part and the second moving part are disposed on the first surface of the jig main body,
wherein the first moving part attachment is disposed in the first cut out of the jig main body, the second moving part attachment is disposed in the second cut out of the jig main body,
the first moving part attachment extends from a first surface side of the jig main body to a second surface side of the jig main body,
the second moving part attachment extends from the first surface side of the jig main body to the second surface side of the jig main body.

8. The jig according to claim 7, further comprising:
a first magnet, disposed on the first moving part attachment, the first magnet is configured to fix the upper center beam to the first magnet;
a second magnet, disposed on the second moving part attachment, the second magnet is configured to fix the upper center beam to the second magnet;
wherein the first magnet and the second magnet are disposed on the second surface side of the jig main body.

9. The jig according to claim 7, further comprising:
a first positioning part, comprising a first protrusion, disposed on the first moving part attachment;
a second positioning part, comprising a second protrusion, disposed on the second moving part attachment,
wherein the first positioning part is configured to engage with a first shape of the upper center beam to position the upper center beam relative to the first positioning part and the first abutting surface,
wherein the second positioning part is configured to engage with a second shape of the upper center beam to position the upper center beam relative to the second positioning part and the second abutting surface.

* * * * *